US008554662B2

(12) United States Patent
Al-Saadi

(10) Patent No.: US 8,554,662 B2
(45) Date of Patent: Oct. 8, 2013

(54) DELTA NEUTRAL FUTURES ALLOCATION

(75) Inventor: Mina Al-Saadi, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 303 days.

(21) Appl. No.: 12/869,866

(22) Filed: Aug. 27, 2010

(65) Prior Publication Data

US 2012/0054082 A1    Mar. 1, 2012

(51) Int. Cl.
    *G06Q 40/00*    (2012.01)
(52) U.S. Cl.
    USPC .......................................................... 705/37
(58) Field of Classification Search
    USPC ..................................................... 705/35–45
    See application file for complete search history.

(56) References Cited

U.S. PATENT DOCUMENTS

| | | | | |
|---|---|---|---|---|
| 6,061,662 | A * | 5/2000 | Makivic | 705/36 R |
| 7,440,917 | B2 * | 10/2008 | Farrell et al. | 705/36 R |
| 7,509,275 | B2 * | 3/2009 | Glinberg et al. | 705/35 |
| 7,778,911 | B2 * | 8/2010 | Salvadori et al. | 705/36 R |
| 7,991,671 | B2 * | 8/2011 | Hadi et al. | 705/36 R |
| 7,991,684 | B2 * | 8/2011 | Salvadori et al. | 705/37 |
| 8,160,949 | B2 * | 4/2012 | Johnston et al. | 705/36 R |
| 2002/0082967 | A1 * | 6/2002 | Kaminsky et al. | 705/37 |
| 2002/0194115 | A1 * | 12/2002 | Nordlicht et al. | 705/37 |
| 2003/0097328 | A1 * | 5/2003 | Lundberg et al. | 705/37 |
| 2004/0199452 | A1 * | 10/2004 | Johnston et al. | 705/37 |
| 2007/0162373 | A1 | 7/2007 | Kongtcheu | |
| 2007/0174182 | A1 | 7/2007 | Bodurtha et al. | |
| 2008/0082441 | A1 * | 4/2008 | Johnston et al. | 705/37 |
| 2008/0086408 | A1 * | 4/2008 | Johnson et al. | 705/37 |
| 2008/0288390 | A1 * | 11/2008 | Maynard | 705/37 |
| 2009/0043712 | A1 | 2/2009 | Bridges et al. | |
| 2009/0125451 | A1 * | 5/2009 | Rowell et al. | 705/36 R |
| 2009/0171824 | A1 | 7/2009 | Glinberg et al. | |
| 2009/0248588 | A1 * | 10/2009 | Hadi et al. | 705/36 R |
| 2010/0306133 | A1 * | 12/2010 | Johnston et al. | 705/36 R |
| 2011/0066536 | A1 | 3/2011 | Milne | |
| 2011/0066568 | A1 * | 3/2011 | Milne et al. | 705/36 R |

OTHER PUBLICATIONS

MacRae, Desmond, "Derivatives: Globex's bright if distant future", Global Investor; Apr. 1993; 61; Proquest Central, pp. 1-3.*
Verhoeven, Peter; Fain, Alexander; How, Janice Cy., "Spread trading: A description of the combination order flow on the Australian Stock Exchange", Derivatives Use, Trading & Regulation 10. 3 (2004): pp. 241-254.*
International Search Report and Written Opinion issued in corresponding PCT Application No. PCT/US11/46372 mailed Nov. 17, 2011; 6 pages.
Delta Neutral/volatility strategies on LIFFE Connect®, Nov. 2, 2004, 3 pgs.
LIFFE Options, a guide to trading strategies, ©LIFFE 2002, 70 pgs.

* cited by examiner

*Primary Examiner* — Mohammad Z Shaikh
(74) *Attorney, Agent, or Firm* — Lempia Summerfield Katz LLC

(57) ABSTRACT

In an Exchange which assigns only a whole number/integer approximate of a computed number of futures contracts to a covered order for one or more option contracts, the disclosed embodiments relate to factoring a residual number of futures contracts, remaining after fulfillment of an incoming covered order counter to a resting covered order for a quantity of options contracts less than the resting quantity and approximation of the computed number of futures contracts assigned thereto, into the approximation of the computed number of futures contracts assigned to fulfillment of a subsequent order from the same trader counter to the same resting order for less than or equal to the remaining resting quantity of options contracts. This may have the effect of increasing or decreasing the number of futures contracts assigned to the subsequent order.

18 Claims, 4 Drawing Sheets

US 8,554,662 B2

DELTA NEUTRAL FUTURES ALLOCATION

BACKGROUND

In the financial industry, and in particular, the derivative instrument markets, delta is defined as the ratio of a change in the price of an underlying instrument, e.g. a commodity, equity, security, contract, or other asset or combination thereof, referred to as an "underlier" or "underlying asset," to the change in the price of a derivative instrument, e.g. an options contract, based thereon, such as the ratio of a change in the price of a futures contract to the change in the price of an option contract on that futures contract. A portfolio comprising multiple instruments, derivative or otherwise, also referred to as "positions," may be characterized by an overall delta based on the deltas of the portfolio's constituent instruments and the parameters thereof. In particular, the portfolio may be characterized as being "delta neutral" when the deltas of the various constituent instruments are offsetting, e.g. some positive and some negative such that the net delta is zero. When the delta of an instrument/position or a portfolio is positive, the position or portfolio may be characterized as being over-hedged and when the delta of an instrument/position or a portfolio is negative, the position or portfolio may be characterized as being under hedged. Either situation may be undesirable or otherwise sub-optimal depending upon the trader's trading strategy as the level of risk offset is either less than what the trader desired or is more than the trader needs, resulting in unnecessary and/or undesired risk and/or cost.

Delta hedging refers to an options strategy that aims to reduce, i.e. hedge, the risk associated with price movements in an underlying asset by offsetting long and short positions therein, i.e. purchases and sales. For example, a long call option position on a stock may be delta hedged by shorting the underlying stock. This strategy is based on the change in premium (the price of the option) caused by a change in the price of the underlying security. The change in premium for each basis-point change in the price of the underlying asset is the delta and the relationship between the two movements is the hedge ratio, i.e. the ratio, determined by an option's delta, of futures contracts to options on futures contracts required to establish a riskless position. For example, if a $1/barrel change in the underlying Oil futures price leads to a $0.25/barrel change in the options premium, the hedge ratio is four (four options for each futures contract).

To facilitate delta hedging, or other trading strategies where a trader wishes to manage the delta of their portfolio or otherwise hedge risk in their trading strategy, an Exchange, such as the Chicago Mercantile Exchange, may offer products or mechanisms to allow a trader to make trades which result in a desired delta specified by the trader. This resultant delta, for example, in combination with other positions in their portfolio, may result in an overall delta neutral portfolio or, alternatively, an overall desired delta value for the portfolio.

For example, the Exchange may offer, as a product or service, a "covered trade," also referred to as a "delta neutral" trade, which is a spread that includes both the option contract, i.e. the derivative, and a futures contract, i.e. the underlier, entered as a single order for the covered option at a delta specified by the user, whereby the Exchange will calculate and provide/assign the appropriate quantity of futures contracts automatically to achieve the specified delta based on the quantity of option contracts specified in the order. For example: if the trader places an order to buy a covered call option or sell a covered put option, the Exchange will assign the trader with an order to sell one or more futures contracts; and if the trader places an order to buy a covered put option or sell a covered call option, the Exchange will assign the trader with an order to buy one or more futures contracts; etc. Note that another trader submitting the matching counter order will be assigned the counter position in the futures contracts as well.

The quantity of futures contracts is computed and the futures contracts are assigned, typically, at the time that the options order is matched with another order counter thereto. The number of futures contracts assigned is based on the quantity of options contracts filled and may be calculated as the quantity of options contracts filled multiplied by the desired delta. For example, if a trader places an order for a covered trade of 100 options at a delta of 0.30 and if the order completely matches with a counter order of the same quantity (for purposes of the discussion herein, the fact that the order "matches" implies that all of the other requisite parameters of the two orders are aligned), then the number of futures contracts assigned to the trade will be 30, i.e. 100×0.30. If the counter order is only for a quantity of 10, then the number of futures contracts assigned to the trade will be 3, i.e. 10×0.30, and the remaining quantity of 90 will remain on the order book "resting" and waiting for another counter order to be received which, at that time, will be assigned additional futures contracts depending upon the quantity filled.

DETAILED DESCRIPTION OF THE DRAWINGS AND PRESENTLY PREFERRED EMBODIMENTS

Figure 1:
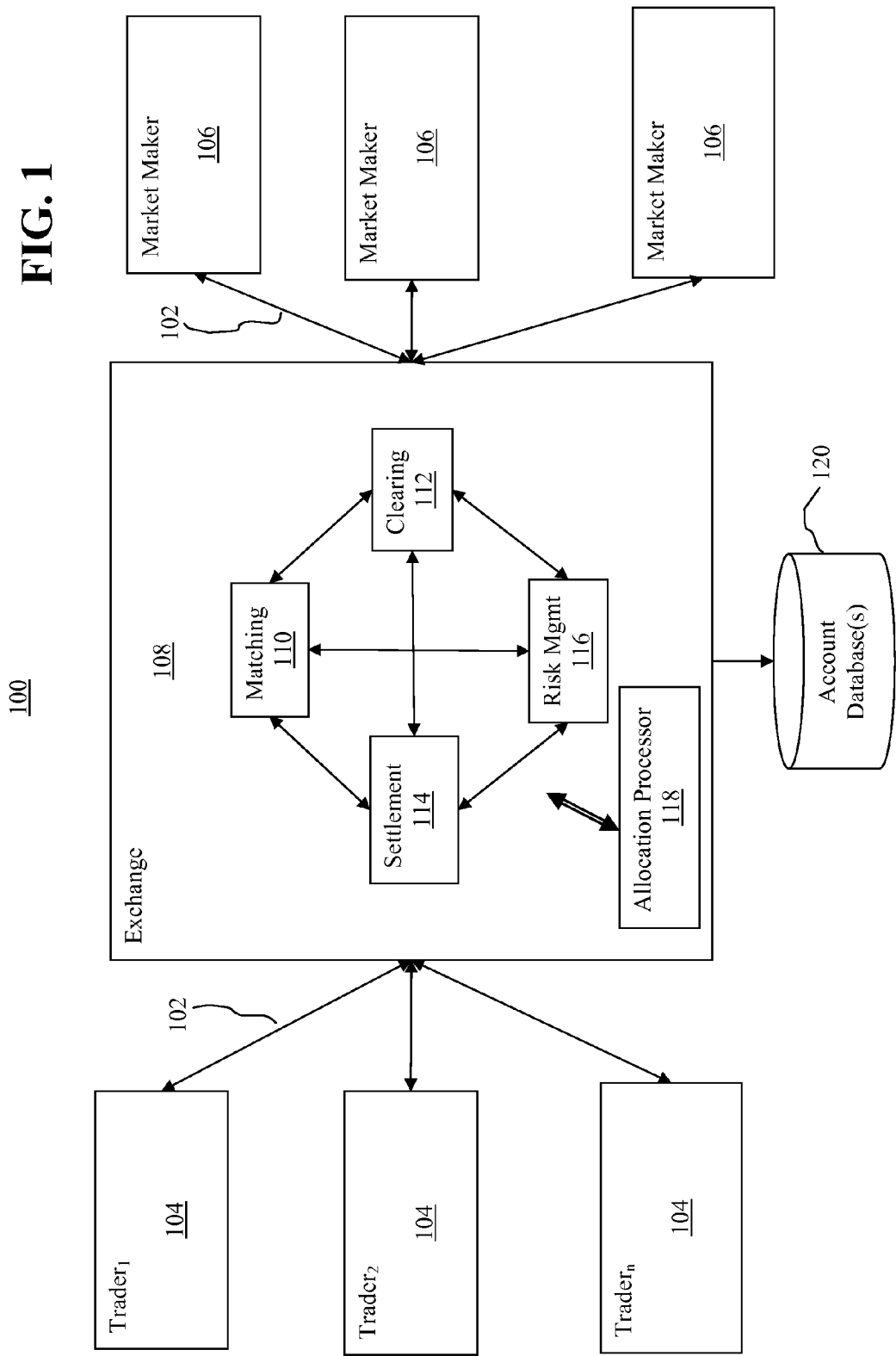
FIG. 1 depicts a block diagram of an exemplary system for trading covered instruments according to the disclosed embodiments.

When assigning futures contracts to a trade, as described above, the calculation of the number of futures contracts to assign may result in a fractional number of futures contracts, e.g. an order for 10 options at a delta of 0.25 will result in the assignment of 2.5 futures contracts. As used herein, the terms fraction, decimal fraction, fractional futures contract and fractional number of futures contracts refers to the fractional part of the decimal number, i.e. the digits to the right of the decimal point, in the result of a computation of the futures contract component of a covered trade. For example, where the computed number of futures contracts is 2.25, the fractional number of futures contracts is 0.25.

Exchange rules may prevent the assignment of fractional futures contracts, allowing only transactions in whole number quantities. Accordingly, the computed number of futures contracts assigned to a given trade may be approximated, e.g. rounded up or down to the nearest whole number of futures contracts wherein the threshold for when to round up or down is implementation dependent and may be a static or a dynamic threshold. For example, any value less than x.5 will be rounded down, e.g. to x, and any value greater than or equal to x.5 will be rounded up, e.g. to x+1. Rounding is the process of approximating a quantity, be it for convenience or, as in the case of numerical computations, of necessity. Roundoff error is the difference between an approximation of a number used in computation and its exact (correct) value. In certain types of computations, roundoff error can be magnified as any initial errors are carried through one or more intermediate steps. Herein, roundoff error resulting from the whole number approximation of a computed number of futures contracts, i.e. the difference between the computed number of futures contracts and the whole number approximate thereof, will be referred to as the number or quantity of residual futures contracts and may be a positive or negative number.

In the above example, the trade for 10 options at a delta of 0.25 may result in 3 futures contracts being assigned, i.e. 2.5 rounded up to 3, with 0.5 residual futures contracts. Alternatively, a trade of 5 options at a delta of 0.25 may result in 1 futures contract being assigned, i.e. 1.25 rounded down to 1, with −0.25 (negative 0.25) residual futures contracts. In either case, the trader ends up with a delta greater than or less than the desired delta and is therefore either over- or under-hedged, i.e. used herein a positive residual futures contracts value is indicative of the trader being under-hedged and a negative residual futures contracts value is indicative of the trader being over-hedged.

Since large resting orders may be filled by numerous smaller counter orders, these unallocated residual futures contracts may accumulate. In some cases, the trader submitting the counter order may be assigned no futures contracts, e.g. if a trader submits 100 orders, each for a quantity of 1 which all trade against a resting order for a quantity of 100 at a specified delta of 0.25, each trade will result in 0 futures (0.25 rounded down) and, upon complete fulfillment of the resting order, the trader who submitted the resting order and was expecting 25 futures contracts, i.e. 100×0.25, will end up with none. Accordingly, the trader who placed the order for 100 at delta 0.25 ends up with an unhedged position as no futures contracts were assigned.

Such activity may be intentional, such as by a trader trying to game the market to gain an advantage, or unintentional, such as by a trader unaware of the consequences of their orders or as a result of automated orders submitted by an algorithmic trading system based on some internal formula, and may result in discouraging traders from placing orders for covered trades. For example, a trader may wish to avoid the futures contract component of a covered trade in order to take advantage of a change in the futures contract as compared to the covered options contract, on that futures contract, prices, such as to hedge the options contracts on their own, in particular when the options price in the covered market is attractive and not otherwise available in the outright, i.e. non-covered, market and the transaction costs are the same.

To impart fairness and predictability as well as encourage the use of covered trades, an Exchange could restrict the quantities and/or specified deltas of covered orders to ensure that the computation of the number of futures contracts assigned to a trade always results in a whole number of futures contracts assigned. For example, if the resting covered order is for a quantity 100 at a delta of 0.25, incoming orders counter thereto may be restricted to quantities which are multiples of four. This is referred to as "clip size." In an alternative implementation, all covered orders, whether matching or not, may be constrained, in some manner, to ensure that a whole number of futures contracts are assigned. However, as will be appreciated, rounding is still occurring but it is being performed by the trader who must adjust their order prior to submission to comply with the restrictions of the Exchange. Accordingly, a trader still may end up with an undesirable or sub-optimal hedge position.

Another alternative method to implement covered trades in a fair manner is to monitor resting covered orders and, as incoming orders, from any trader for less than the resting quantity, are matched against the resting order, residual futures contracts remaining after rounding, up or down, are accumulated until a whole futures contract results. Instructions to cancel or modify the resting order may reset the tracking of accumulated residual futures contracts. Each accumulated whole futures contract is then assigned to, or deducted from, the current incoming matching order, depending on the implementation. However, this may result in the trader who submits the last incoming order getting a futures contract assigned that they otherwise may not have been assigned, while a trader who submitted a previous incoming order was not assigned a futures contract when they should have been, or vice versa. Accordingly, as with the previous method, a particular trader may be unfairly over- or under-hedged as compared to other traders.

In Exchanges which permit matching of incoming covered orders from various traders for quantities less than the quantity of a resting covered order, the disclosed embodiments implement a substantially fair allocation of fractional futures contracts among the various participating traders, which is desirable to minimize the occurrence of any one participating trader being over or under-hedged as a result of their trades as compared to the other participating traders. However: as rounding of assigned futures contracts is generally a requirement of the Exchange; restriction of order quantities and delta values is undesirable; and submission of sufficient matching orders to account for a fractional futures contract result cannot be guaranteed, the occurrence of one trader ending up over- or under-hedged may not be entirely eliminated.

The disclosed systems and methods relate, therefore, to minimizing or otherwise reducing the frequency of an over- or under-fill of a futures contract component of a covered/delta neutral trade, i.e. for accounting for roundoff error and adjusting or correcting the hedge position of a trader to more closely approximate a desired hedge position. In one embodiment, this is accomplished by tracking the fractional futures contracts components that are rounded up or down when computing the futures contract component for a covered trade (Δ×quantity=futures contract component). When existing counter-parties enter trades with a resting order, any previously over- or under-hedged futures contract positions are included, either added or deducted, when determining the expected futures contract component of the current trade. In other words, under- or over-hedged positions will be tracked for each trader. Thereby, the disclosed embodiments attempt to be more equitable in the allocation of futures contracts, favoring neither party.

In particular, in an Exchange which assigns only a whole number/integer approximate of a computed number of futures contracts to a covered order for one or more option contracts, the disclosed embodiments factor a residual number of futures contracts, remaining after fulfillment of an incoming covered order counter to a resting covered order for a quantity of options contracts less than the resting quantity and approximation of the computed number of futures contracts assigned thereto, into the approximation of the computed number of futures contracts assigned to fulfillment of a subsequent order from the same trader counter to the same resting order for less than or equal to the remaining resting quantity of options contracts. This may have the effect of increasing or decreasing the number of futures contracts assigned to the subsequent order.

FIG. 1 shows a block diagram of an exemplary system 100 for trading covered instruments according to the disclosed embodiments. The system 100 is essentially a network 102 coupling market participants 104 106, including traders$_{1-n}$ 104 and market makers 106 with the Exchange 108, such as the Chicago Mercantile Exchange. Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The Exchange 108 provides the functions of matching 110 buy/sell transactions, such as orders to buy or sell covered instruments, clearing 112 those transactions, settling 114 those transactions and managing risk 116 among the market participants 104 106 and between the market participants and the Exchange 108, as well as allocating and assigning underlying instruments to covered orders, as is discussed in more detail below.

While the disclosed embodiments relate to the trading of covered options on futures contracts, the mechanisms and methods described herein are not limited thereto and may be applied to any covered product, e.g. any derivative financial product/instrument wherein the order thereofore further includes a specification of a ratio, by the trader, of the ordered quantity of the derivative financial product thereof to a quantity of the underlying financial product, wherein the Exchange computes and assigns the requisite quantity of the underlying financial product.

Typically, the Exchange 108 provides a "clearing house" which is a division of the Exchange 108 through which all trades made must be confirmed, matched and settled each day until offset or delivered. The clearing house is an adjunct to the Exchange 108 responsible for settling trading accounts, clearing trades, collecting and maintaining performance bond funds, regulating delivery and reporting trading data. Essentially mitigating credit. Clearing is the procedure through which the Clearing House becomes buyer to each seller of, for example, a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House. In the case of the CME's clearing house, all clearing members not specifically designated as Class B members are considered Class A clearing members. In the CME there are three categories of clearing members: 1) CME clearing members, qualified to clear transactions for all commodities; 2) IMM clearing members, qualified to clear trades for only IMM and IOM commodities; and 3) IMM Class B clearing members, solely limited to conducting proprietary arbitrage in foreign currencies between a single Exchange-approved bank and the IMM and who must be guaranteed by one or more Class A non-bank CME or IMM clearing member(s). Note that a "member" is a broker/trader registered with the Exchange. It will be appreciated that such classifications are implementation dependent.

In the presently disclosed embodiments, the Exchange 108 assumes an additional role as an allocation processor for the underlying instruments for a covered order, i.e., the Exchange 108 will compute and assign the requisite quantity of the underlying instrument to achieve the specified delta. As used herein, the term "Exchange" 108 will refer to the centralized clearing and settlement mechanisms, risk management systems, etc., as described below, used for futures contracts, as well as options thereon, trading, including the described enhancements to facilitate covered transactions.

While the disclosed embodiments will be described in reference to the CME, it will be appreciated that these embodiments are applicable to any Exchange 108, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

As an intermediary, the Exchange 108 bears a certain amount of risk in each transaction that takes place. To that end, risk management mechanisms protect the Exchange via the Clearing House. The Clearing House establishes clearing level performance bonds (margins) for all CME products and establishes minimum performance bond requirements for customers of CME products. A performance bond, also referred to as a margin, is the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The accounts of individual members, clearing firms and non-member customers doing business through CME must be carried and guaranteed to the Clearing House by a clearing member. In every matched transaction executed through the Exchange's facilities, the Clearing House is substituted as the buyer to the seller and the seller to the buyer, with a clearing member assuming the opposite side of each transaction. The Clearing House is an operating division of the Exchange 108, and all rights, obligations and/or liabilities of the Clearing House are rights, obligations and/or liabilities of CME. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contra-side to every position, the Clearing House is held accountable to the clearing members for the net settlement from all transactions on which it has been substituted as provided in the Rules.

Figure 2:
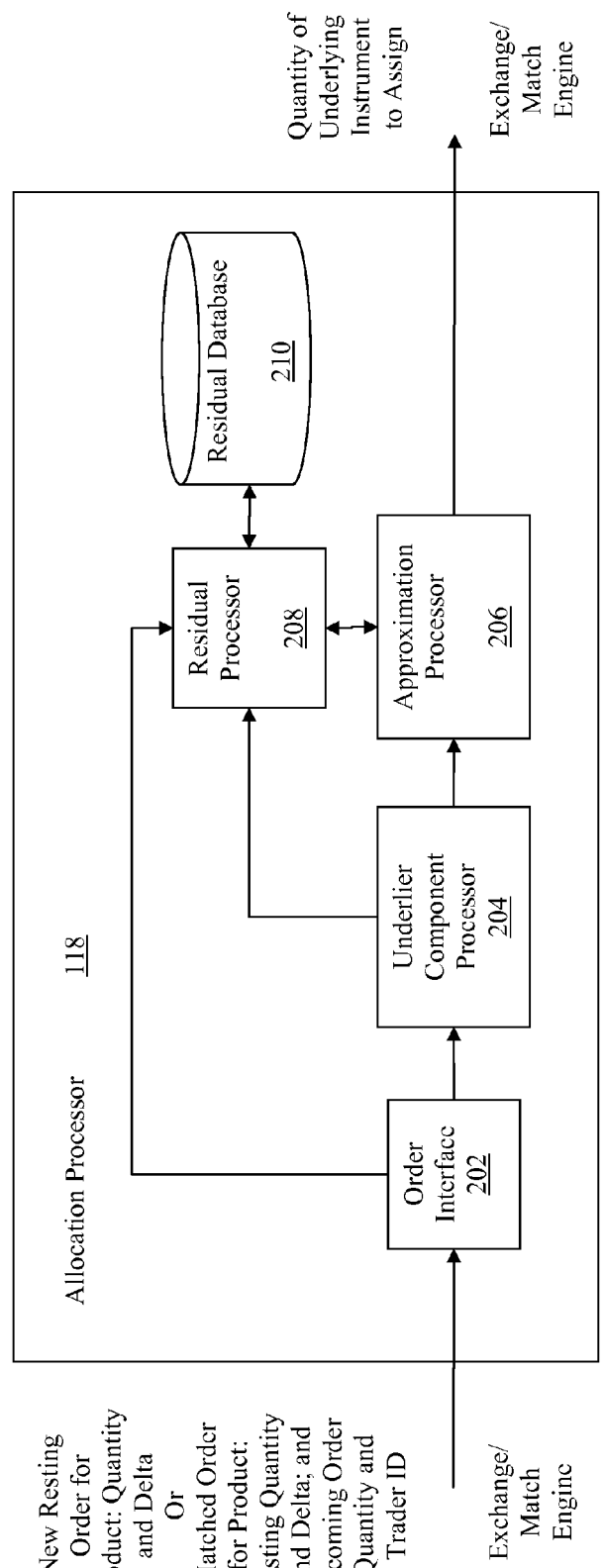
FIG. 2 depicts a block diagram of the allocation processor of FIG. 1 according to one embodiment.

As shown in FIG. 2, a system for allocating a fractional number of futures contracts to a trader 104, in an Exchange 108 which assigns only a whole number approximate of a computed number of futures contracts to a covered order/trade for one or more option contracts, may further include an allocation processor 118. In one embodiment, the allocation processor 118 is operative to determine the residual number of futures contracts remaining after fulfillment of an incoming covered order counter to a resting covered order for a quantity of options contracts less than the resting quantity and approximation of the computed number of futures contracts assigned thereto. The residual number of futures contracts may be a positive value, i.e. under-hedged, or a negative value, i.e. over-hedged. The allocation processor 118 is further operative to factor the residual number of futures contracts into the pre-approximation computation of the number of futures contracts to be assigned to fulfillment of a subsequent order from the same trader counter to the same resting order for less than or equal to the remaining resting quantity of options contracts, and approximate the number of futures contracts assigned to the subsequent order based on the pre-approximation computation. The residual number of futures contracts may be factored into the pre-approximation computation by adding the residual number of futures contracts to the pre-approximation computed number of futures contracts. It will be appreciated that adding a negative value results in a subtraction/deduction and that this may also be implemented using absolute values for the residual number of futures contracts where under-hedge values are added and over-hedged values are subtracted/deducted.

In particular, FIG. 2 shows a block diagram of a system for allocating a fractional quantity of an underlying financial product to a trader that submits a plurality of orders, each being for a quantity of a derivative financial product derived from the underlying financial product and each being counter to a previously received order for a quantity of the derivative financial product, the previously received order being further characterized by a specified ratio of the quantity of the derivative financial product thereof to a quantity of the underlying financial product. In one embodiment, the underlying financial product may be a futures contract and the derivative financial product may be an option contract based on the futures contract and the specified ratio may be a delta value.

Generally, in one embodiment, the system operates on orders for covered instruments as they are received by the Exchange 108. In alternative embodiment, the disclosed algorithms may be applied in batch, such as at the end of the trading day based on the orders placed and matched during a defined time period.

In particular, in one embodiment, when an order is received for a covered instrument, e.g. Product X for a quantity $QTY_Z$ and a trader specified delta value of $\Delta$, from a particular trader 104, e.g. Trader Z, the Exchange 108, via the match engine 110, will determine if the order is counter to an existing order, i.e. a resting order that was previously received but not filled, i.e. not completely satisfied, if at all, by a counter order. Processing of received orders which match against a resting order is described below. Assuming, however, that this received order for Product Z from Trader Z is not counter to an existing order, the Exchange 108 will place the order on the order book to rest, with a resting quantity of $QTY_{Z\,rest}$ equal to the order quantity $QTY_Z$, and await a subsequent counter order from the same or another trader. The Exchange 108 further notifies the Covered Product Allocation Processor 118 which, for Product X and delta value $\Delta$, resets the tracked residual quantity values $Residual_n$, described in more detail below, for all traders$_{1-n}$ 104 to 0 in the residual database 210. In an alternative embodiment, residual quantity values for traders$_{1-n}$ 104, or a subset thereof, may be carried forward to be factored into other transactions.

When a subsequent incoming order for Product X, quantity $QTY_{incoming}$ and a specified delta value, is received from another trader 104, e.g. Trader T, the Exchange 108 determines if it is counter to, i.e. matches, the resting order that was previously received, e.g. the subsequent order is for the same product at the same delta value. The trader 104 may be identified, for example, by the Sender-Sub ID field of the trade order request. If the subsequent order does not match, it is treated as described above and placed on the order book to rest. However, where the subsequent order matches the previous order, the quantity of the subsequent order is compared against the resting quantity by the allocation processor 118. It will be appreciated that this process is iterative and that multiple orders may be received from one or more traders and matched against the resting order until the resting quantity is depleted, i.e. the resting order is completely filled.

If the quantity of the incoming order $QTY_{incoming}$ is greater than the resting quantity $QTY_{Z\,rest}$, the resting order is filled and the remaining unfilled portion of the incoming order for Product X at delta value $\Delta$ from Trader T is placed on the order book to rest with a resting quantity of $QTY_{T\,rest}=QTY_{incoming}-QTY_{Z\,rest}$. Further, the trade is assigned a quantity of futures contracts, as was described above, the quantity $ExpFutures_{rest}$ being computed as round $(QTY_{Z\,rest} \times \Delta)$. In this situation, in one embodiment, any residual fractional quantity of futures contracts resulting from the calculation is discarded. Alternatively, this residual quantity may be stored, i.e. carried forward, in association with either Trader Z, the trader 104 of the resting order, or Trader T, the trader 104 of the incoming order, to be factored into a future computation of assigned futures contracts. The system then returns to a state to await the next order, either counter to the new resting order or for a new Product X and/or specified delta value.

If the quantity of the incoming order $QTY_{incoming}$ is less than or equal to the resting quantity $QTY_{Z\,rest}$, the allocation processor computes the quantity of futures contracts that would be assigned based on the resting order quantity $QTY_{Z\,rest}$ and the quantity of futures contracts that would be assigned based on the incoming order quantity $QTY_{incoming}$, both referred to as the "expected" futures contracts. The quantity of expected futures contracts for the resting order $ExpFutures_{rest}$ is computed as round $(QTY_{Z\,rest} \times \Delta)$ which is the value that a trade would be assigned if the resting order were completely filled. The quantity of expected futures contracts for the incoming order $ExpFutures_{incoming}$ is computed as Round $((QTY_{incoming} \times \Delta)+Residual_T)$ where $Residual_T$ is the residual quantity of futures contracts carried forward for Trader T from a prior trade by Trader T for this same product and delta value, described in more detail below. If this is the first trade by Trader T against the resting order, the residual quantity $Residual_T$ will be zero. The residual quantity $Residual_T$ may be a positive or negative value and may result in raising or lowering the quantity of futures contracts assigned to the present trade. The quantity of futures contracts assigned to the present trade will then be the lesser of the quantity of expected futures contract for the resting order, Exp Futures$_{rest}$, or the quantity of the expected futures contract for the incoming order, ExpFutures$_{incoming}$.

The allocation processor 118 then computes the residual quantity of futures contracts Residual$_{incoming}$ that were not assigned due to the rounding function as ((QTY$_{incoming}$×Δ)+ Residual$_T$)−ExpFutures$_{incoming}$. Residual$_{incoming}$ may be, as described above, zero, a positive or negative number. This residual quantity is then stored as Residual$_T$ in a database 210 in association with the trader 104, Trader T, of the incoming order to be carried forward, described above, for a subsequent trade by Trader T for the same product/same delta. It will be appreciated that, at any given time, as noted above, multiple traders may have residual quantities stored in the database 210 for the particular Product and delta. Where the incoming order completely fills the resting order, the computation of the residual quantity of futures contracts Residual$_{incoming}$ that were not assigned due to the rounding function may be avoided as, at least in one embodiment, the residual values stored in the database 210 are reset regardless as described below.

If the resting order is completely filled, the system returns to the state of awaiting the next order. Since the resting order is no longer on the order book, as described above, subsequent order for the same product at the same delta value will be considered a new order not matched against a resting order and any residual quantity values stored therefore will be reset. However, if the resting order is not completely filled, the system simply awaits the next matching order from the same trader or another trader and applies any carried forward residual quantity, as described above, for the particular trader. It should be noted that while an order is resting, the trader 104 who submitted that order may modify the resting quantity QTY$_{Z\,rest}$. Such modifications do not affect the above calculations as the new quantity is merely factored into the calculations, as described above, at the time a matching order is received.

Referring back to FIG. 2 in more detail, the system, which, as will be described in more detail below, may be implemented in a processor having a memory, which includes an allocation processor 118, implemented for example by first logic stored in the memory and executable by the processor, operative to receive, such as via an order interface 202, a first order of the plurality of orders. The logic may be stored in the memory in the form of instructions. The first order, for example, may be for a quantity of a financial product less than the quantity of a previously received order. The allocation processor 118 may further include an underlier component processor 204, an approximation processor 206 coupled therewith, a residual processor 208 coupled with the order interface 202 and the underlier component processor 204 and a residual database 210 coupled with the residual processor 208.

The underlier component processor 204, which may be implemented as second logic stored in the memory and executable by the processor, is operative to compute a first quantity of the underlying financial product, based on the quantity of the derivative financial product of the first order, to substantially achieve the specified ratio. In one embodiment, the first quantity of the underlying financial product is computed as the quantity of the derivative financial product of the first order multiplied by the specified ratio.

The approximation processor 206, which may be implemented as third logic stored in the memory and executable by the processor, is operative to approximate the first quantity of the underlying financial product to determine a first whole number quantity of the underlying financial product and assign the first whole number quantity of the underlying financial product to the first order when the first order is fulfilled. In one embodiment, the approximation of the first quantity of the underlying financial product further comprises rounding the first quantity of the underlying financial product wherein the residual quantity of the underlying financial product is computed as a difference between the first quantity of the underlying and financial product and the rounded first quantity of the underlying financial product.

The residual processor 208, which may be implemented as fourth logic stored in the memory and executable by the processor, is operative to compute a residual quantity of the underlying financial product remaining after fulfillment of the first order and approximation of the first quantity of the underlying financial product and wherein the residual processor is further operative to store, in a database 210 coupled therewith, the residual quantity of the underlying financial product in association with the trader 104. In one embodiment, the residual quantity may be one of zero, a positive number or a negative number. Further, the database 210 may be the same database 120 in which the Exchange 108 stores account information for the market participants 104 106 or may be a separate database 210. The data stored in the database 210 may be in the form of a record associating an identification of the Trader 104, an identification of the particular derivative financial product and the residual quantity. A given Trader$_{1-n}$ 104 may have multiple records, each for a different derivative financial product. Alternatively, the database 210 may include only a single record structure for each Trader$_{1-n}$ 104 which includes an identifier of each traded derivative financial product and the residual quantity associated therewith. It will be appreciated that the structure of the database 210 may be implementation dependent.

The allocation processor 118 is further operative to receive a second order of the plurality of orders subsequent to the first order via the order interface 202, the second order being for a quantity of the derivative financial product not exceeding the quantity of the derivative financial product of the previous order remaining after fulfillment of the first order, and in response to receipt of the second order, the allocation processor is further operative to determine the identity of the trader 104 who submitted the second order and access the database 210 based thereon to retrieve the stored residual quantity of the underlying financial product associated therewith.

The underlier component processor 204 is further operative to compute a second quantity of the underlying financial product based on the quantity of the derivative financial product of the second order and the retrieved stored residual quantity of the underlying financial product to substantially achieve the specified ratio.

The approximation processor 206 is further operative to approximate the second quantity of the underlying financial product to determine a second whole number quantity of the underlying financial product and assign the second whole number quantity of the underlying financial product to the second order when the second order is fulfilled. As described above, the underlier component processor 204 may compute the second quantity of the underlying financial product twice, once based on the remaining quantity of the first order and again based on the quantity of the derivative financial product of the second order and the retrieved stored residual quantity, wherein the approximation processor 206 may assign lesser of the approximated results of the two computations.

As discussed above, the second whole number quantity of the underlying financial product assigned to the second order may be different than an approximation of the second quantity of the underlying financial product not including the stored residual quantity of the underlying financial product.

In one embodiment, wherein the second order is for a quantity of the derivative financial product less than the quantity of the previous order remaining after fulfillment of the first order, the allocation processor 118 may be further operative to receive a third order of the plurality of orders subsequent to the second order via the order interface 202, the third order being for a quantity greater than the quantity of the previous order remaining after fulfillment of the first and second orders. This order may be received from the same trader who submitted the second order or from a different trader. In response thereto, the underlier component processor 204 may be further operative to compute a third quantity of the underlying financial product, based on the quantity of the derivative financial product of the previous order remaining after fulfillment of the first and second orders, to substantially achieve the specified ratio. Further, the approximation processor 206 may be further operative to approximate the third quantity of the underlying financial product to determine a third whole number quantity of the underlying financial product and assigning the third whole number quantity of the underlying financial product to the third order when the third order is fulfilled; and the residual processor 208 may be further operative to reset, in the database 210, any residual quantity of the underlying financial product stored in association with the trader based on trades counter to the previously received order since the remaining quantity of the previous order has now been filled. As discussed, the excess quantity of the third order above the quantity remaining of the previous order may now be placed on the order book to rest, i.e. await a subsequent counter order.

As was described above, the allocation processor 118 may be further operative to receive, subsequent to receipt of the first order and prior to receipt of the second order, a modification to the previous order via the order interface which modifies the quantity of the derivative financial product thereof remaining after fulfillment of the first order. In this case, the modified quantity is used in subsequent calculations.

When the second order is for a quantity of the derivative financial product less than the quantity of the previous order remaining after fulfillment of the first order, the residual processor 208 may be further operative to compute the residual quantity of the underlying financial product remaining after fulfillment of the second order and approximation of the second quantity of the underlying financial product, and store in the database 210 coupled therewith, the residual quantity of the underlying financial product in association with the trader who submitted the second order. Thereby, the residual quantity of the underlying financial product is carried forward to be factored into a subsequent trade by the same trader counter to the resting order, should one be submitted.

Figure 3:
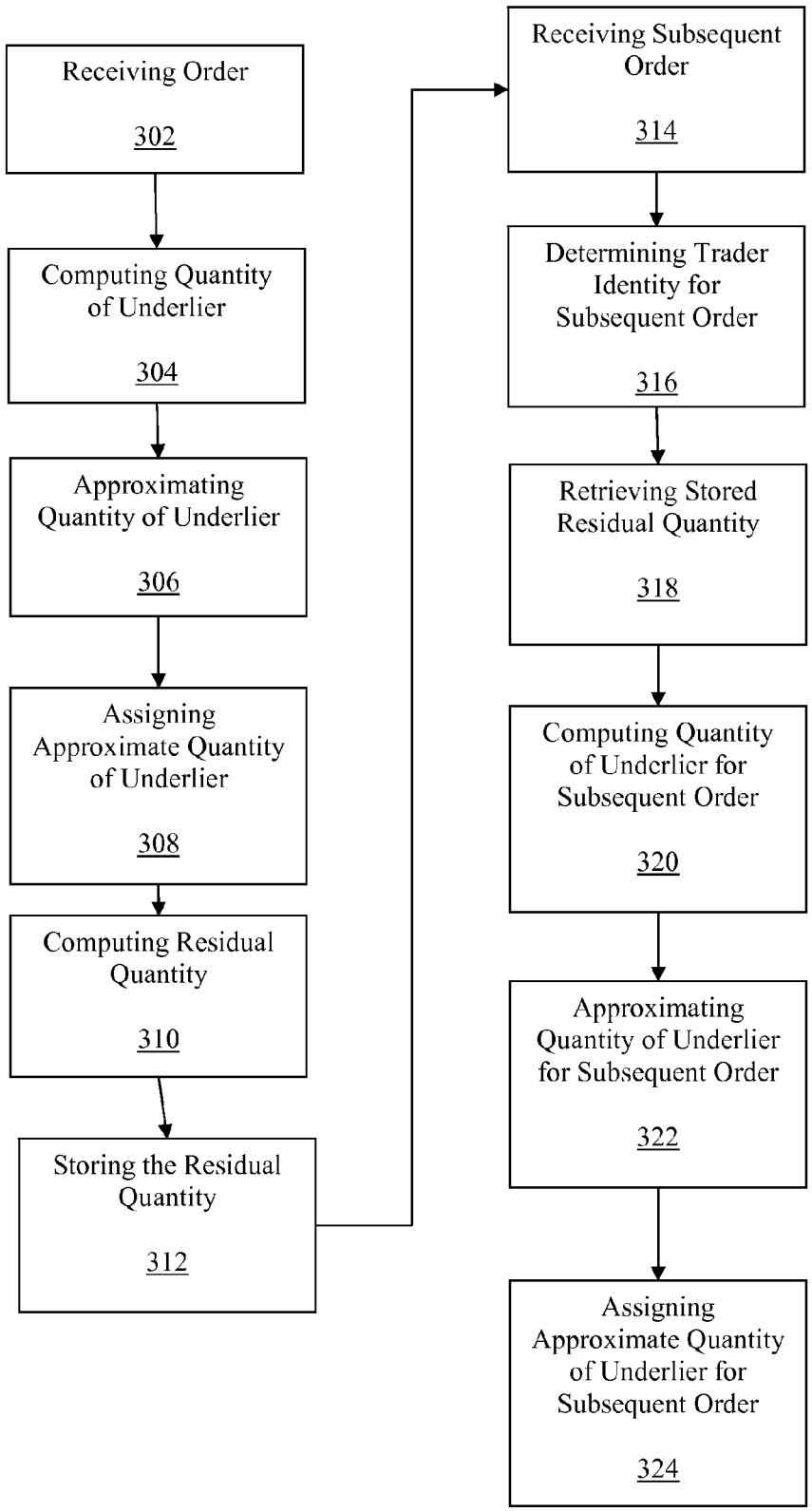
FIG. 3 depicts a flow chart demonstrating operation of the system of FIG. 1 according to one embodiment.

FIG. 3 shows an exemplary process, which may be implemented in a computer, for allocating a fractional number of futures contracts to a trader in an Exchange which assigns only a whole number approximate of a computed number of futures contracts to a covered order for one or more option contracts. The process may include: determining, by an allocation processor, the residual number of futures contracts remaining after fulfillment of an incoming covered order counter to a resting covered order for a quantity of options contracts less than the resting quantity and approximation of the computed number of futures contracts assigned thereto; factoring, by the allocation processor, the residual number of futures contracts into the pre-approximation computation of the number of futures contracts to be assigned to fulfillment of a subsequent order from the same trader counter to the same resting order for less than or equal to the remaining resting quantity of options contracts; and approximating, by the allocation processor, the number of futures contracts assigned to the subsequent order based on the pre-approximation computation.

In particular, FIG. 3 demonstrates allocating a fractional quantity of an underlying financial product to a trader that submits a plurality of orders, each being for a quantity of a derivative financial product derived from the underlying financial product and each being counter to a previously received order for a quantity of the derivative financial product, the previously received order being further characterized by a specified ratio of the quantity of the derivative financial product thereof to a quantity of the underlying financial product. In one embodiment, the underlying financial product may be a futures contract and the derivative financial product may be an option contract based on the futures contract. Further, in one embodiment, the specified ratio may be a delta value.

The operation includes: receiving, by an allocation processor 118, such as via an order interface 102, a first order of the plurality of orders, the first order being for a quantity of the derivative financial product less than the quantity of the derivative financial product of the previously received order (block 302); and computing, by the allocation processor, a first quantity of the underlying financial product, based on the quantity of the derivative financial product of the first order, to substantially achieve the specified ratio (block 304). In one embodiment, the first quantity of the underlying financial product may be computed as the quantity of the derivative financial product of the first order multiplied by the specified ratio.

The operation further includes approximating, by the allocation processor, the first quantity of the underlying financial product to determine a first whole number quantity of the underlying financial product (block 306) and assigning the first whole number quantity of the underlying financial product to the first order when the first order is fulfilled (block 308). In one embodiment, the approximating of the first quantity of the underlying financial product may include rounding the first quantity of the underlying financial product wherein the residual quantity of the underlying financial product is computed as a difference between the first quantity of the underlying and financial product and the rounded first quantity of the underlying financial product.

The operation further includes computing, by the allocation processor, a residual quantity of the underlying financial product remaining after fulfillment of the first order and approximation of the first quantity of the underlying financial product (block 310), wherein, in one embodiment, the residual quantity may be one of zero, a positive number or a negative number.

The operation further includes: storing, by the allocation processor in a database coupled therewith, the residual quantity of the underlying financial product in association with the trader (block 312); receiving, by the allocation processor, a second order of the plurality of orders subsequent to the first order, the second order being for a quantity of the derivative financial product not exceeding the quantity of the derivative financial product of the previous order remaining after fulfillment of the first order (block 314); determining, by the allocation processor, the identity of the trader who submitted the second order (block 316) and accessing the database based thereon to retrieve the stored residual quantity of the underlying financial product associated therewith (block 318); computing, by the allocation processor, a second quantity of the underlying financial product based on the quantity of the derivative financial product of the second order and the retrieved stored residual quantity of the underlying financial product to substantially achieve the specified ratio (block 320); and approximating, by the underlying component processor, the second quantity of the underlying financial product to determine a second whole number quantity of the underlying financial product (block 322) and assigning the second whole number quantity of the underlying financial product to the second order when the second order is fulfilled (block 324). As described above, the second quantity of the underlying financial product may be computed twice, once based on the remaining quantity of the first order and again based on the quantity of the derivative financial product of the second order and the retrieved stored residual quantity, wherein the lesser of the approximated results of the two computations may be assigned. The second whole number quantity of the underlying financial product assigned to the second order may be different than an approximation of the second quantity of the underlying financial product not including the stored residual quantity of the underlying financial product.

In one embodiment, wherein the second order is for a quantity of the derivative financial product less than the quantity of the previous order remaining after fulfillment of the first order, operation of the disclosed system further includes: receiving, by the allocation processor, a third order of the plurality of orders subsequent to the second order, the third order being for a quantity greater than the quantity of the previous order remaining after fulfillment of the first and second orders; computing, by the allocation processor, a third quantity of the underlying financial product, based on the quantity of the derivative financial product of the previous order remaining after fulfillment of the first and second orders, to substantially achieve the specified ratio; approximating, by the allocation processor, the third quantity of the underlying financial product to determine a third whole number quantity of the underlying financial product and assigning the third whole number quantity of the underlying financial product to the third order when the third order is fulfilled; and resetting, by the allocation processor in the database, any residual quantity of the underlying financial product stored in association with the trader based on trades counter to the previously received order.

In one embodiment, wherein the second order is for a quantity of the derivative financial product less than the quantity of the previous order remaining after fulfillment of the first order, operation of the disclosed system further includes: computing, by the allocation processor, the residual quantity of the underlying financial product remaining after fulfillment of the second order and approximation of the second quantity of the underlying financial product; and storing, by the allocation processor in the database, the residual quantity of the underlying financial product in association with the trader.

Figure 4:
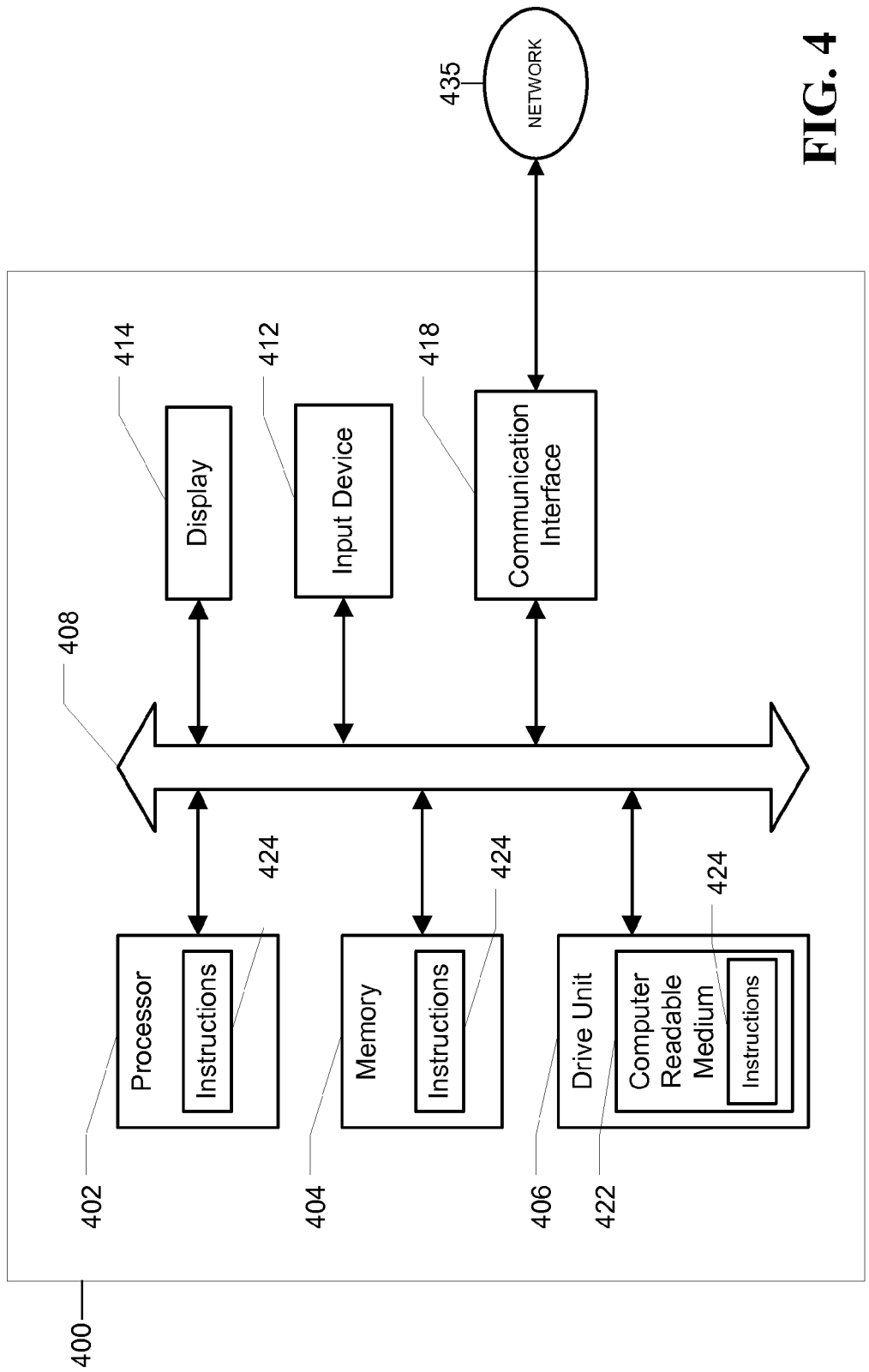
FIG. 4 depicts a block diagram of an exemplary implementation of the disclosed embodiments.

FIG. 4 illustrates a general computer system 400, which may represent the allocation processor 118, or any of the other computing devices referenced herein. The computer system 400 may include a set of instructions 424 that may be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 424 (sequential or otherwise) that specify actions to be taken by that machine. In a particular embodiment, the computer system 400 may be implemented using electronic devices that provide voice, video or data communication. Further, while a single computer system 400 may be illustrated, the term "system" shall also be taken to include any collection of systems or subsystems that individually or jointly execute a set, or multiple sets, of instructions to perform one or more computer functions.

By way of example, the disclosed embodiments may operate as follows:

Assume Resting Order Quantity=50 at Delta=0.20

Trade 1:
A 22-lot is entered into the market at the desired price. The number of futures contracts expected by the incoming order is 4 (22*0.20). The expected futures contract calculation is rounded down (implying an under-hedged futures position). The size of the incoming order is less than that of the resting order, so the Sender-Sub ID is tracked: W115USA. Since the incoming order's expected futures contract calculation was rounded, an under-hedged futures contract position of 0.4 is associated with the Sender-Sub ID. If the Sender-Sub ID is identified as an opposing party to a subsequent trade, this position will be included in the "expected futures contract" calculation.

Trade 2:
The resting order has a quantity of 28 remaining. Expected futures component is 6.
Existing counter-party, W115USA, enters an 11-lot order that will trade with the resting order. In calculating the expected futures contract component, the under-hedged 0.4 futures position is included in the calculation. Therefore, the expected futures contract component=3 ((11*0.20)+0.4).
6>3, therefore 3 futures contracts are assigned to the trade.
Since the size of the incoming order is less than that of the resting order, W115USA continues to be tracked. Given that the expected futures contracts calculation was rounded up for this Sender-Sub ID (implying an over-hedged position), a position of −0.4 is associated with the Sender-Sub ID. If W115USA is the opposing party to a subsequent trade with this resting order, the over-hedged futures contracts position will be included in the "expected futures contracts" calculation.

Trade 3:
The resting order has a quantity of 17 remaining. Expected futures contract component is 3.
W115USA enters a 3-lot order that will trade with the resting order.
Expected futures component is 0 ((3*0.20)−0.4).
W115USA continues to be tracked and an under-hedged position of 0.2 is associated with the ID.

Trade 4:
The resting order has a quantity of 14 remaining. Expected futures contract component is 3.
W115USA enters a 15-lot order that will trade with the resting order.

Expected futures is 3 ((15*0.2)+0.2). Since 15>14, the delta calculation does not include the residual underhedged quantity.

The resting order is completely filled and receives 3 futures contracts with the trade. W115USA is filled on 14 and receives 3 futures contracts.

Totals:

Resting order: 50 strategies+10 futures contracts

W115USA: 50 strategies+10 futures contracts

W115USA now has a resting order of 1 in the Covered Strategy.

As illustrated in FIG. 4, the computer system 400 may include a processor 402, such as, a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 404 may include a cache or random access memory for the processor 402. Alternatively or in addition, the memory 404 may be separate from the processor 402, such as a cache memory of a processor, the system memory, or other memory. The memory 404 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 404 may be operable to store instructions 424 executable by the processor 402. The functions, acts or tasks illustrated in the figures or described herein may be performed by the programmed processor 402 executing the instructions 424 stored in the memory 404. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 400 may further include a display 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 412 configured to allow a user to interact with any of the components of system 400. The input device 412 may be a number pad, a keyboard, or a cursor control device, such as a mouse, or a joystick, touch screen display, remote control or any other device operative to interact with the system 400.

The computer system 400 may also include a disk or optical drive unit 406. The disk drive unit 406 may include a computer-readable medium 422 in which one or more sets of instructions 424, e.g. software, can be embedded. Further, the instructions 424 may perform one or more of the methods or logic as described herein. The instructions 424 may reside completely, or at least partially, within the memory 404 and/or within the processor 402 during execution by the computer system 400. The memory 404 and the processor 402 also may include computer-readable media as discussed above.

The present disclosure contemplates a computer-readable medium 422 that includes logic, such as in the form of instructions 424 or receives and executes instructions 424 responsive to a propagated signal; so that a device connected to a network 435 may communicate voice, video, audio, images or any other data over the network 435. Further, the instructions 424 may be transmitted or received over the network 435 via a communication interface 418. The communication interface 418 may be a part of the processor 402 or may be a separate component. The communication interface 418 may be created in software or may be a physical connection in hardware. The communication interface 418 may be configured to connect with a network 235, external media, the display 414, or any other components in system 400, or combinations thereof. The connection with the network 435 may be a physical connection, such as a wired Ethernet connection or may be established wirelessly as discussed below. Likewise, the additional connections with other components of the system 400 may be physical connections or may be established wirelessly.

The network 435 may include wired networks, wireless networks, or combinations thereof. The wireless network may be a cellular telephone network, an 802.11, 802.16, 802.20, or WiMax network. Further, the network 435 may be a public network, such as the Internet, a private network, such as an intranet, or combinations thereof, and may utilize a variety of networking protocols now available or later developed including, but not limited to TCP/IP based networking protocols.

The computer-readable medium 422 may be a single medium, or the computer-readable medium 422 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 422 may include a solid-state memory such as a memory card or other package that houses one or more non-volatile read-only memories. The computer-readable medium 422 also may be a random access memory or other volatile re-writable memory. Additionally, the computer-readable medium 422 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the invention. Thus, to the maximum extent allowed by law, the scope is to be determined by the broadest permissible interpretation of the following claims and their equivalents, and shall not be restricted or limited by the foregoing detailed description.

I claim:

1. A computer implemented method of allocating a fractional quantity of an underlying financial product to a trader that submits a plurality of orders, each being for a quantity of a derivative financial product derived from the underlying financial product and each being counter to a previously received order for a quantity of the derivative financial product, the previously received order being further characterized by a specified ratio of the quantity of the derivative financial product thereof to a quantity of the underlying financial product, the method comprising:

receiving, by an allocation processor, a first order of the plurality of orders, the first order being for a quantity of the derivative financial product less than the quantity of the derivative financial product of the previously received order;

computing, by the allocation processor, a first quantity of the underlying financial product, based on the quantity of the derivative financial product of the first order, to substantially achieve the specified ratio, wherein the specified ratio comprises a delta value;

approximating, by the allocation processor, the first quantity of the underlying financial product to determine a first whole number quantity of the underlying financial product and assigning the first whole number quantity of the underlying financial product to the first order when the first order is fulfilled, wherein the approximating of the first quantity of the underlying financial product comprises rounding the first quantity of the underlying financial product;

computing, by the allocation processor, a residual quantity of the underlying financial product remaining after fulfillment of the first order and approximation of the first, wherein the residual quantity of the underlying financial product is computed as a difference between the first quantity of the underlying financial product and the rounded first quantity of the underlying financial product;

storing, by the allocation processor in a database coupled therewith, the residual quantity of the underlying financial product in association with the trader;

receiving, by the allocation processor, a second order of the plurality of orders subsequent to the first order, the second order being for a quantity of the derivative financial product not exceeding the quantity of the derivative financial product of the previous order remaining after fulfillment of the first order;

determining, by the allocation processor, the identity of the trader who submitted the second order and accessing the database based thereon to retrieve the stored residual quantity of the underlying financial product associated therewith;

computing, by the allocation processor, a second quantity of the underlying financial product based on the quantity of the derivative financial product of the second order and the retrieved stored residual quantity of the underlying financial product to substantially achieve the specified ratio; and approximating, by the underlying component processor, the second quantity of the underlying financial product to determine a second whole number quantity of the underlying financial product and assigning the second whole number quantity of the underlying financial product to the second order when the second order is fulfilled.

2. The computer implemented method of claim 1, wherein the underlying financial product comprises a futures contract and the derivative financial product comprises an option contract based on the futures contract.

3. The computer implemented method of claim 1, wherein the second order is for a quantity of the derivative financial product less than the quantity of the previous order remaining after fulfillment of the first order, the method further comprising:

receiving, by the allocation processor, a third order of the plurality of orders subsequent to the second order, the third order being for a quantity greater than the quantity of the previous order remaining after fulfillment of the first and second orders;

computing, by the allocation processor, a third quantity of the underlying financial product, based on the quantity of the derivative financial product of the previous order remaining after fulfillment of the first and second orders, to substantially achieve the specified ratio;

approximating, by the allocation processor, the third quantity of the underlying financial product to determine a third whole number quantity of the underlying financial product and assigning the third whole number quantity of the underlying financial product to the third order when the third order is fulfilled; and resetting, by the allocation processor in the database, any residual quantity of the underlying financial product stored in association with the trader based on trades counter to the previously received order.

4. The computer implemented method of claim 1 further comprising receiving by the allocation processor, subsequent to receipt of the first order and prior to receipt of the second order, a modification to the previous order modifying the quantity of the derivative financial product thereof remaining after fulfillment of the first order.

5. The computer implemented method of claim 1, wherein the residual quantity may be one of zero, a positive number or a negative number.

6. The computer implemented method of claim 1, wherein the first quantity of the underlying financial product is computed as the quantity of the derivative financial product of the first order multiplied by the specified ratio.

7. The computer implemented method of claim 1, wherein the second order is for a quantity of the derivative financial product less than the quantity of the previous order remaining after fulfillment of the first order, the method further comprising:

computing, by the allocation processor, the residual quantity of the underlying financial product remaining after fulfillment of the second order and approximation of the second quantity of the underlying financial product; and storing, by the allocation processor in the database, the residual quantity of the underlying financial product in association with the trader.

8. The computer implemented method of claim 1, wherein the second whole number quantity of the underlying financial product assigned to the second order is different than an approximation of the second quantity of the underlying financial product not including the stored residual quantity of the underlying financial product.

9. A system for allocating a fractional quantity of an underlying financial product to a trader that submits a plurality of orders, each being for a quantity of a derivative financial product derived from the underlying financial product and each being counter to a previously received order for a quantity of the derivative financial product, the previously received order being further characterized by a specified ratio of the quantity of the derivative financial product thereof to a quantity of the underlying financial product, the system comprising:

an allocation processor operative to receive a first order of the plurality of orders, the first order being for a quantity of the derivative financial product less than the quantity of the derivative financial product of the previously received order;

an underlier component processor coupled with the allocation processor and operative to compute a first quantity of the underlying financial product, based on the quantity of the derivative financial product of the first order, to substantially achieve the specified ratio, wherein the specified ratio comprises a delta value;

an approximation processor coupled with the underlier component processor and operative to approximate the first quantity of the underlying financial product to determine a first whole number quantity of the underlying financial product and assign the first whole number quantity of the underlying financial product to the first order when the first order is fulfilled, wherein the approximating of the first quantity of the underlying financial product comprises rounding the first quantity of the underlying financial product;

a residual processor coupled with the underlier component processor and the approximation processor and operative to compute a residual quantity of the underlying financial product remaining after fulfillment of the first order and approximation of the first quantity of the underlying financial product and wherein the residual processor is further operative to store, in a database coupled therewith, the residual quantity of the underlying financial product in association with the trader, wherein the residual quantity of the underlying financial product is computed as a difference between the first quantity of the underlying financial product and the rounded first quantity of the underlying financial product; and wherein the allocation processor is further operative to receive a second order of the plurality of orders subsequent to the first order, the second order being for a quantity of the derivative financial product not exceeding the quantity of the derivative financial product of the previous order remaining after fulfillment of the first order, and in response to receipt of the second order, the allocation processor being further operative to determine the identity of the trader who submitted the second order and access the database based thereon to retrieve the stored residual quantity of the underlying financial product associated therewith;

the underlier component processor being further operative to compute a second quantity of the underlying financial product based on the quantity of the derivative financial product of the second order and the retrieved stored residual quantity of the underlying financial product to substantially achieve the specified ratio; and the approximation processor being further operative to approximate the second quantity of the underlying financial product to determine a second whole number quantity of the underlying financial product and assign the second whole number quantity of the underlying financial product to the second order when the second order is fulfilled.

10. The system of claim 9, wherein the underlying financial product comprises a futures contract and the derivative financial product comprises an option contract based on the futures contract.

11. The system of claim 9, wherein the second order is for a quantity of the derivative financial product less than the quantity of the previous order remaining after fulfillment of the first order, and further wherein:

the allocation processor is further operative to receive a third order of the plurality of orders subsequent to the second order, the third order being for a quantity greater than the quantity of the previous order remaining after fulfillment of the first and second orders;

the underlier component processor is further operative to compute a third quantity of the underlying financial product, based on the quantity of the derivative financial product of the previous order remaining after fulfillment of the first and second orders, to substantially achieve the specified ratio;

the approximation processor is further operative to approximate the third quantity of the underlying financial product to determine a third whole number quantity of the underlying financial product and assigning the third whole number quantity of the underlying financial product to the third order when the third order is fulfilled; and the residual processor is further operative to reset, in the database, any residual quantity of the underlying financial product stored in association with the trader based on trades counter to the previously received order.

12. The system of claim 9 wherein the allocation processor is further operative to receive, subsequent to receipt of the first order and prior to receipt of the second order, a modification to the previous order which modifies the quantity of the derivative financial product thereof remaining after fulfillment of the first order.

13. The system of claim 9, wherein the residual quantity may be one of zero, a positive number or a negative number.

14. The system of claim 9, wherein the first quantity of the underlying financial product is computed as the quantity of the derivative financial product of the first order multiplied by the specified ratio.

15. The system of claim 9, wherein the second order is for a quantity of the derivative financial product less than the quantity of the previous order remaining after fulfillment of the first order, and further wherein:

the residual processor is further operative to compute the residual quantity of the underlying financial product remaining after fulfillment of the second order and approximation of the second quantity of the underlying financial product, and store in the database coupled therewith, the residual quantity of the underlying financial product in association with the trader.

16. The system of claim 9, wherein the second whole number quantity of the underlying financial product assigned to the second order is different than an approximation of the second quantity of the underlying financial product not including the stored residual quantity of the underlying financial product.

17. A system for allocating a fractional quantity of an underlying financial product to a trader that submits a plurality of orders, each being for a quantity of a derivative financial product derived from the underlying financial product and each being counter to a previously received order for a quantity of the derivative financial product, the previously received order being further characterized by a specified ratio of the quantity of the derivative financial product thereof to a quantity of the underlying financial product, the system comprising:

means for receiving a first order of the plurality of orders, the first order being for a quantity of the derivative financial product less than the quantity of the derivative financial product of the previously received order;

means for computing a first quantity of the underlying financial product, based on the quantity of the derivative financial product of the first order, to substantially achieve the specified ratio, wherein the specified ratio comprises a delta value;

means for approximating the first quantity of the underlying financial product to determine a first whole number quantity of the underlying financial product and assigning the first whole number quantity of the underlying financial product to the first order when the first order is fulfilled, wherein the approximating of the first quantity of the underlying financial product comprises rounding the first quantity of the underlying financial product;

means for computing a residual quantity of the underlying financial product remaining after fulfillment of the first order and approximation of the first quantity of the underlying financial product, wherein the residual quantity of the underlying financial product is computed as a difference between the first quantity of the underlying financial product and the rounded first quantity of the underlying financial product;

means for storing the residual quantity of the underlying financial product in association with the trader;

means for receiving a second order of the plurality of orders subsequent to the first order, the second order being for a quantity of the derivative financial product not exceeding the quantity of the derivative financial product of the previous order remaining after fulfillment of the first order;

means for determining the identity of the trader who submitted the second order and accessing the database based thereon to retrieve the stored residual quantity of the underlying financial product associated therewith;

means for computing a second quantity of the underlying financial product based on the quantity of the derivative financial product of the second order and the retrieved stored residual quantity of the underlying financial product to substantially achieve the specified ratio; and means for approximating the second quantity of the underlying financial product to determine a second whole number quantity of the underlying financial product and assigning the second whole number quantity of the underlying financial product to the second order when the second order is fulfilled.

18. A system for allocating a fractional quantity of an underlying financial product to a trader that submits a plurality of orders, each being for a quantity of a derivative financial product derived from the underlying financial product and each being counter to a previously received order for a quantity of the derivative financial product, the previously received order being further characterized by a specified ratio of the quantity of the derivative financial product thereof to a quantity of the underlying financial product, the system comprising a processor and a memory coupled with the process, the system further comprising:

first logic stored in the memory and executable by the processor to receive a first order of the plurality of orders, the first order being for a quantity of the derivative financial product less than the quantity of the derivative financial product of the previously received order;

second logic stored in the memory and executable by the processor to compute a first quantity of the underlying financial product, based on the quantity of the derivative financial product of the first order, to substantially achieve the specified ratio, wherein the specified ratio comprises a delta value;

third logic stored in the memory and executable by the processor to approximate the first quantity of the underlying financial product to determine a first whole number quantity of the underlying financial product and assign the first whole number quantity of the underlying financial product to the first order when the first order is fulfilled, wherein the approximating of the first quantity of the underlying financial product comprises rounding the first quantity of the underlying financial product;

fourth logic stored in the memory and executable by the processor to compute a residual quantity of the underlying financial product remaining after fulfillment of the first order and approximation of the first quantity of the underlying financial product and wherein the residual processor is further operative to store, in a database coupled therewith, the residual quantity of the underlying financial product in association with the trader, wherein the residual quantity of the underlying financial product is computed as a difference between the first quantity of the underlying financial product and the rounded first quantity of the underlying financial product; and wherein the first logic is further executable by the processor to receive a second order of the plurality of orders subsequent to the first order, the second order being for a quantity of the derivative financial product not exceeding the quantity of the derivative financial product of the previous order remaining after fulfillment of the first order, and in response to receipt of the second order, the first logic being further executable by the processor to determine the identity of the trader who submitted the second order and access the database based thereon to retrieve the stored residual quantity of the underlying financial product associated therewith;

the second logic being further executable by the processor to compute a second quantity of the underlying financial product based on the quantity of the derivative financial product of the second order and the retrieved stored residual quantity of the underlying financial product to substantially achieve the specified ratio; and the third logic being further executable by the processor to approximate the second quantity of the underlying financial product to determine a second whole number quantity of the underlying financial product and assign the second whole number quantity of the underlying financial product to the second order when the second order is fulfilled.

* * * * *